United States Patent
Bhatt et al.

(10) Patent No.: US 10,832,166 B2
(45) Date of Patent: Nov. 10, 2020

(54) METHOD AND SYSTEM FOR TEXT CLASSIFICATION BASED ON LEARNING OF TRANSFERABLE FEATURE REPRESENTATIONS FROM A SOURCE DOMAIN

(71) Applicant: Conduent Business Services, LLC, Dallas, TX (US)

(72) Inventors: Himanshu Sharad Bhatt, Nagar (IN); Arun Rajkumar, Chennai (IN); Sriranjani Ramakrishnan, Chennai (IN); Shourya Roy, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 995 days.

(21) Appl. No.: 15/384,357

(22) Filed: Dec. 20, 2016

(65) Prior Publication Data
US 2018/0174071 A1    Jun. 21, 2018

(51) Int. Cl.
*G06N 3/04*     (2006.01)
*G06N 20/00*    (2019.01)
(Continued)

(52) U.S. Cl.
CPC ............ *G06N 20/00* (2019.01); *G06F 16/35* (2019.01); *G06K 9/62* (2013.01); *G06K 9/624* (2013.01);
(Continued)

(58) Field of Classification Search
CPC .................................................. G06N 3/0454
See application file for complete search history.

(56) References Cited

U.S. PATENT DOCUMENTS 10,354,184 B1 * 7/2019 Vitaladevuni ...... G06Q 30/0251
2013/0304739 A1 * 11/2013 Martineau ............ G06F 16/353
707/737
(Continued)

OTHER PUBLICATIONS

Ajakan, Hana, et al. "Domain-adversarial neural networks." arXiv preprint arXiv:1412.4446 (2014). (Year: 2014).*
(Continued)

*Primary Examiner* — Hal Schnee
(74) *Attorney, Agent, or Firm* — Jones Robb, PLLC

(57) ABSTRACT

The disclosed embodiments illustrate a domain adaptation method for learning transferable feature representations from a source domain for a target domain. The method includes receiving real-time input data comprising labeled instances of the source domain and unlabeled instances of the target domain from a computing device. The method further includes determining source specific representation corresponding to the source domain and a common representation shared between the source domain and the target domain. Based on a positive contribution from the source specific representation and the common representation, the labeled instances of the source domain are classified. The method further includes training a generalized classifier based on a positive contribution from the common representation. The method further includes automatically performing text classification on the unlabeled instances of the target domain based on the trained generalized classifier. The result of the text classification is rendered at a user interface of the computing device.

20 Claims, 5 Drawing Sheets

(51) Int. Cl.
*G06F 16/35* (2019.01)
*G06K 9/62* (2006.01)

(52) U.S. Cl.
CPC ......... *G06K 9/6256* (2013.01); *G06K 9/6273* (2013.01); *G06N 3/0454* (2013.01)

(56) References Cited

U.S. PATENT DOCUMENTS

| | | | | |
|---|---|---|---|---|
| 2016/0078359 | A1* | 3/2016 | Csurka | G06K 9/6262 706/12 |
| 2017/0372221 | A1* | 12/2017 | Krishnamurthy | G06N 7/005 |
| 2018/0024968 | A1* | 1/2018 | Clinchant | G06N 3/0454 706/12 |
| 2018/0157972 | A1* | 6/2018 | Hu | G06N 3/0454 |
| 2019/0180136 | A1* | 6/2019 | Bousmalis | G06K 9/4623 |

OTHER PUBLICATIONS

Wang, Chang, and Sridhar Mahadevan. "Heterogeneous domain adaptation using manifold alignment." Twenty-second international joint conference on artificial intelligence. 2011. (Year: 2011).*

S. J. Pan, I. W. Tsang, J. T. Kwok and Q. Yang, "Domain Adaptation via Transfer Component Analysis," in IEEE Transactions on Neural Networks, vol. 22, No. 2, pp. 199-210, Feb. 2011. (Year: 2011).*

Jiang, Jing, and ChengXiang Zhai. "A two-stage approach to domain adaptation for statistical classifiers." Proceedings of the sixteenth ACM conference on Conference on information and knowledge management. 2007. (Year: 2007).*

Shiliang Sun, Honglei Shi, and Yuanbin Wu. 2015. A survey of multi-source domain adaptation. Information Fusion, 24:84-92.

Lorenzo Bruzzone and Mattia Marconcini. 2010. Domain adaptation problems: A dasvm classification technique and a circular validation strategy. IEEE Transactions on Pattern Analysis and Machine Intelligence, 32(5):770-787.

Chih-Chung Chang Chih-Wei Hsu and Chih-Jen Lin. 2003. A practical guide to support vector classification. Technical report, Department of Computer Science, National Taiwan University.

S. J. Pan and Q. Yang. 2010. A survey on transfer learning. IEEE Transactions on Knowledge and Data Engineering, 22(10):1345-1359.

Himanshu Sharad Bhatt, Deepali Semwal, and Shourya Roy. 2015. An iterative similarity based adaptation technique for cross-domain text classification, Xerox Research Center India, Bengaluru, India.

Wenyuan Dai, Gui-Rong Xue, Qiang Yang, and Yong Yu. 2007. Co-clustering based classification for out-of-domain documents. In Proceedings of International Conference on Knowledge Discovery and Data Mining, pp. 210-219.

Sinno Jialin Pan, Xiaochuan Ni, Jian-Tao Sun, Qiang Yang, and Zheng Chen. 2010. Cross-domain sentiment classification via spectral feature alignment. In Proceedings of International Conference on World Wide Web, pp. 751-760.

Corinna Cortes and Mehryar Mohri. 2014. Domain adaptation and sample bias correction theory and algorithm for regression. Theor. Comput. Sci., 519:103-126.

Xavier Glorot, Antoine Bordes, and Yoshua Bengio. 2011. Domain adaptation for large-scale sentiment classification: A deep learning approach. In In Proceedings of the International Conference on Machine Learning.

John Blitzer, Mark Dredze, and Fernando Pereira. 2007. Biographies, bollywood, boom-boxes and blenders: Domain adaptation for sentiment classification. In Proceedings of Association for Computational Linguistics, pp. 440-447.

Sinno Jialin Pan, Ivor W. Tsang, James T. Kwok, and Qiang Yang. 2011. Domain adaptation via transfer component analysis. IEEE Transactions on Neural Networks, 22(2):199-210.

Hana Ajakan, Pascal Germain, Hugo Larochelle, Francois Laviolette, and Mario Marchand. 2014. Domain-adversarial neural networks. arXiv preprint arXiv:1412.4446.

Pascal Vincent, Hugo Larochelle, Yoshua Bengio, and Pierre-Antoine Manzagol. 2008. Extracting and composing robust features with denoising autoencoders. In Proceedings of the International Conference on Machine Learning, pp. 1096-1103.

I. S. Dhillon, S. Mallela, and D. S Modha. 2003. Information-theoretic co-clustering. In Proceedings of International Conference on Knowledge Discovery and Data Mining, pp. 89-98.

Hal Daum'e III. 2009. Frustratingly easy domain adaptation. arXiv preprint arXiv:0907.1815.

Minmin Chen, Zhixiang Xu, Kilian Weinberger, and Fei Sha. 2012. Marginalized denoising autoencoders for domain adaptation.

Himanshu Sharad Bhatt, Arun Rajkumar, and Shourya Roy. 2016. Multi-source iterative adaptation for cross-domain classification. In In Proceedings of International Joint Conference on Artificial Intelligence.

Pascal Germain, Alexandre Lacasse, Franc¸ois Laviolette, and Mario Marchand. 2009. Pac-bayesian learning of linear classifiers. In Proceedings of the 26th Annual International Conference on Machine Learning, pp. 353-360. ACM.

Mahsa Baktashmotlagh, Mehrtash T. Harandi, Brian C. Lovell, and Mathieu Salzmann. 2013. Unsupervised domain adaptation by domain invariant projection. In The IEEE International Conference on Computer Vision (ICCV), December .

* cited by examiner

US 10,832,166 B2

METHOD AND SYSTEM FOR TEXT CLASSIFICATION BASED ON LEARNING OF TRANSFERABLE FEATURE REPRESENTATIONS FROM A SOURCE DOMAIN

TECHNICAL FIELD

The presently disclosed embodiments are related, in general, to data processing. More particularly, the presently disclosed embodiments are related to a domain adaptation method and system for text classification based on learning of transferable feature representations from a source domain.

BACKGROUND

Mostly, machine learning (ML) based automation systems are supervised systems, and primarily rely on labeled examples coded by analysts for learning specific tasks, such as text classification. The idea of using ML-based automation systems has led to significant contributions to domain adaptation and transfer learning (DA/TL) techniques. The DA/TL techniques leverage knowledge, such as labeled data, from one or multiple source domains to learn an accurate model for unlabeled data in a target domain.

Typically, systems that deploy DA/TL techniques for text classification work on the assumption that the source data is labeled and the target data is unlabeled. Such systems learn a common representation where distributions of the source and the target data look as similar as possible. In accordance with such common representation, a model (or a classifier) trained on the source data is expected to perform efficiently on the target data as well. Learning such common representation is utilized to transfer knowledge from the source domain to the target domain. However, in certain scenarios, it may result in negative transfer of features as each domain comprises domain specific features which are highly discriminating only within a domain and thus, may negatively contribute to the learning in the target domain if transferred in a brute force manner. Thus, an advanced technique may be desired that mitigates such negative transfer of features by learning domain specific as well as common representations for text classification.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a domain adaptation method for text classification based on learning of transferable feature representations from a source domain for a target domain. The domain adaptation method includes receiving, by one or more processors in a data processing server, real-time input data from a computing device over a communication network, wherein the received input data comprises labeled instances of the source domain and unlabeled instances of the target domain. The domain adaptation method further includes determining, by a source specific processor in the data processing server, source specific representation corresponding to the source domain, and, by a common processor, a common representation shared between the source domain and the target domain. The domain adaptation method further includes classifying, by a classification processor in the data processing server, the labeled instances of the source domain based on a positive contribution from the source specific processor that provides the source specific representation and the common processor that provides the common representation. The domain adaptation method further includes training, by a domain regression processor in the data processing server, a generalized classifier based on a positive contribution from the common processor that provides the common representation. The domain adaptation method further includes automatically performing, by the one or more processors, text classification on the unlabeled instances of the target domain based on the trained generalized classifier, wherein result of the text classification automatically performed on the unlabeled instances of the target domain is rendered at a user interface of the computing device over the communication network.

According to embodiments illustrated herein, there is provided a domain adaptation system for text classification based on learning of transferable feature representations from a source domain for a target domain. The system includes one or more processors in a data processing server configured to receive real-time input data from a computing device over a communication network, wherein the received input data comprises labeled instances of the source domain and unlabeled instances of the target domain. A source specific processor in the data processing server may be configured to determine source specific representation corresponding to the source domain. A common processor in the data processing server may be configured to determine a common representation shared between the source domain and the target domain. A classification processor in the data processing server may be configured to classify the labeled instances of the source domain based on a positive contribution from the source specific processor that provides the source specific representation and the common processor that provides the common representation for a source-target pair. A domain regression processor in the data processing server may be configured to train a generalized classifier based on a positive contribution from the common processor that provides the common representation. The one or more processors in the data processing server may be further configured to automatically perform text classification on the unlabeled instances of the target domain based on the trained generalized classifier, wherein result of the text classification automatically performed on the unlabeled instances of the target domain is rendered at a user interface of the computing device over the communication network.

According to embodiments illustrated herein, there is provided a computer program product for use with a computing device. The computer program product comprises a non-transitory computer readable medium storing a computer program code for domain adaptation for text classification based on learning of transferable feature representations from a source domain for a target domain. The computer program code is executable by one or more processors to receive real-time input data from a computing device over a communication network, wherein the received input data comprises labeled instances of the source domain and unlabeled instances of the target domain. The computer program code is further executable by a source specific processor to determine source specific representation corresponding to the source domain, and, by a common processor, a common representation shared between the source domain and the target domain. The computer program code is further executable by a classification processor to classify the labeled instances of the source domain based on a positive contribution from the source specific processor that provides the source specific representation and the common processor that provides the common representation. The computer program code is further executable by a domain regression processor to train a generalized classifier based on a positive contribution from the common processor that provides the common representation. The computer program code is further executable by the one or more processors to automatically perform text classification on the unlabeled instances of the target domain based on the trained generalized classifier, wherein result of the text classification automatically performed on the unlabeled instances of the target domain is rendered at a user interface of the computing device over the communication network.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
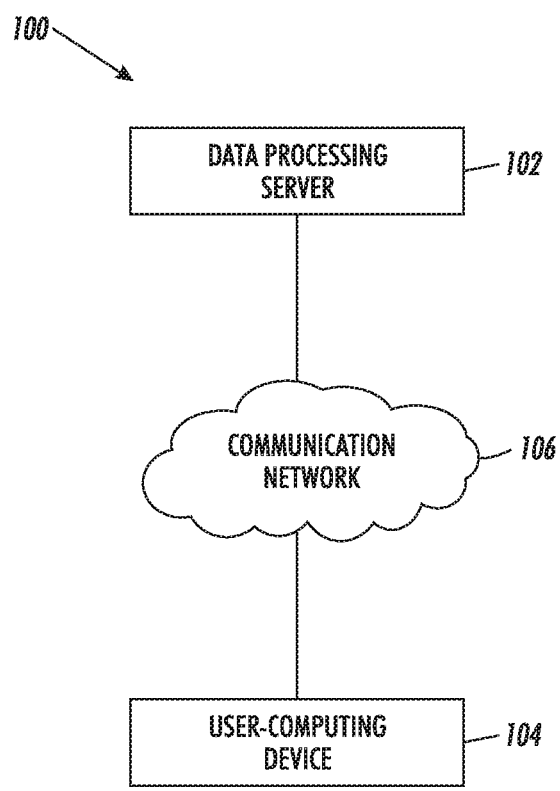
FIG. 1 is a block diagram that illustrates a system environment, in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions

The following terms shall have, for the purposes of this application, the meanings set forth below:

A "computing device" refers to a computer, a device (that includes one or more processors/microcontrollers and/or any other electronic components), or a system (that performs one or more operations according to one or more programming instructions/codes) associated with a user. Examples of the computing device may include, but are not limited to, a desktop computer, a laptop, a personal digital assistant (PDA), a mobile device, a smartphone, and a tablet computer (e.g., iPad® and Samsung Galaxy Tab®).

A "source domain" corresponds to a technical or business field for which a classifier is already trained. In an embodiment, labeled instances (such as, a plurality of source text segments) from the source domain are utilized to train the classifier to label/classify a plurality of unlabeled instances in a target domain.

"Labeled instances" of a source domain correspond to instances that are associated with a label in a plurality of labels associated with the source domain. Examples of the labeled instances may include labeled images, labeled text segments, and/or labeled audio segments associated with the source domain. For instance, the labeled instances may correspond to labeled text segments. In such a case, the labeled text segments may include a plurality of keywords.

A "target domain" refers to a technical or business field for which a classifier is to be trained. In an embodiment, labeled instances (such as, a plurality of source text segments) from the source domain may be utilized to train the classifier to label/classify a plurality of unlabeled instances in the target domain.

"Unlabeled instances" of a target domain correspond to instances that are to be associated with a label in a plurality of labels associated with the target domain by use of a classifier. Examples of the labeled instances may include unlabeled images, unlabeled text segments, and/or unlabeled audio segments associated with the target domain. For instance, the unlabeled instances may correspond to unlabeled text segments. In such a case, the unlabeled text segments may include a plurality of keywords.

An "input data" refers to labeled instances of a plurality of source domains and unlabeled instances of a target domain.

A "source specific representation" corresponds to features that are specific to each of a plurality of source domains. Examples of the source specific representation associated with a source domain may include keywords present in a comment, a review, a message, a post, a share, a tweet, and/or the like by one or more users on a social networking site. In an embodiment, the source specific representation may be labeled, such that each source specific representation is associated with a label in a plurality of labels.

A "global representation" refers to features that are common between a plurality of source domains and a target domain. Examples of the global representation may include keywords that are common between comments, reviews, messages, posts, shares, tweets, and/or the like, associated with a plurality of source domains. In an embodiment, the global representation may be labeled. The global representation may be utilized to train a generalized classifier for classification of unlabeled instances.

A "common representation" refers to features that are common between a source domain and a target domain. Examples of the common representation may include keywords that are common between comments, reviews, messages, posts, shares, tweets, and/or the like, associated with the source domain and the target domain.

A "source representation" refers to features that are common between a source-target pair in a plurality of source-target pairs. The source-target pair may include a source domain of a plurality of source domains. Thus, each source is associated with a source-target pair and each source-target pair is associated with a source representation. Examples of the source representation may include keywords that are common between comments, reviews, messages, posts, shares, tweets, and/or the like, associated with a source-target pair.

A "classification" refers to categorization of unlabeled instances target domain or unlabeled instances of a plurality of source domains. In an embodiment, the classification may be performed by use of a classifier trained based on labeled instances of the plurality of source domains.

A "label" corresponds to a tag/metadata associated with a text-segment/keyword/audio-segment/image. In an embodiment, the label associated with the text-segment/keyword/audio-segment/image may be indicative of one or more properties, such as an emotion/sentiment or polarity, depicted by the text-segment/keyword/audio-segment/image.

"Training" refers to a process of updating/tuning a classifier using training data, such that the classifier, once trained, may be able to label unlabeled instances in a target domain and classify the labeled target instances into a category of a plurality of categories associated with the target domain. For example, the training data may include instances, such as text segments, that are labeled. An untrained classifier may determine one or more features, such as keywords, from the labeled instances. The untrained classifier may further associate the determined one or more features with the labels of the instances. This process of determining the one or more features and the associating the one or more features with labels may correspond to the training of the classifier. Further, for labeling an unlabeled instance, the trained classifier may determine the one or more features from the unlabeled instance. The classifier may then determine a likelihood of the association of the determined one or more features of the unlabeled instance with the labels. Thereafter, the classifier may label the unlabeled instance with a label that has a maximum likelihood of association with the determined one or more features of the unlabeled instance.

"Positive contribution" of a representation, such as source specific representation, global representation, or source representation, in classification of labeled instances of a source domain refers to a decrease in source classification error for the source domain.

"Penalized contribution" of a source specific representation in learning of a classifier refers to a negative contribution. The penalized contribution of the source specific representation may provide a domain independence to the classifier. Domain independence may represent that the classifier may predict an association of an instance with a source domain or target domain with equal likelihood.

A "generalized classifier" refers to a mathematical model that may be trained based on positive contribution of common representation when there is a single source domain. In an embodiment, when there are multiple source domains, the generalized classifier may be trained based on a positive contribution from a global representation and source representations. The generalized classifier may be utilized to perform text classification on unlabeled instances of a target domain. Examples of the generalized classifier may include, but are not limited to, a Support Vector Machine (SVM), a Logistic Regression, a Bayesian classifier, a Decision Tree classifier, a Copula-based classifier, a K-Nearest Neighbors (KNN) classifier, or a Random Field (RF) classifier.

A "prediction" refers to a determination of a likelihood of association of an instance with a source domain or a target domain. In an embodiment, a classifier may be trained to predict the likelihood of association of the instance with the source domain or the target domain.

"Domain divergence" refers to a measure of divergence or variation in distributions (such as instances) of a source domain and a target domain. In an embodiment, the domain divergence may be utilized by a classifier to predict the likelihood of association of an instance with the source domain or the target domain. Further, the classification error of the classifier may be dependent on the domain divergence. In an embodiment, domain independence of a classifier may be acquire by reducing the domain divergence among the training data of the classifier.

"One or more parameters" associated with a domain regression processor refer to parameters that may be updated based on a negative direction of a gradient for a common representation (between a source domain and a target domain) and in direction of a gradient for a source specific representation. In an embodiment, the update of the one or more parameters associated with the domain regression processor based on the negative direction of the gradient for the common representation may correspond to a positive contribution of the common representation to acquire domain independence for the domain regression processor. The update of the one or more parameters associated with the domain regression processor based on the direction of the gradient for the source specific representation may correspond to a negative or penalized contribution of the source specific representation to acquire domain independence for the domain regression processor.

"One or more parameters" associated with a classification processor refers to parameter that may be updated in a negative direction of a gradient for a common representation and a source specific representation provided by a source specific processor. In an embodiment, the update of the one or more parameters associated with the classification processor in a negative direction of a gradient for a common representation and a source specific representation may correspond to a positive contribution of the common representation and the source specific representation in a source classification error of the classification processor.

"Learning" refers to a step performed prior to training of a classifier. During learning, the classifier explores the training data. For example, a domain regression processor learns a common representation and a source specific representation. The common representation provides a positive contribution and the source specific representation provides a penalized contribution to the learning by the domain regression processor to acquire domain independence. Thus, the learned domain regression processor may train a classifier for classification of unlabeled instance of a target domain.

FIG. 1 is a block diagram of a system environment in which various embodiments may be implemented. With reference to FIG. 1, there is shown a system environment 100 that includes one or more application servers, such as a data processing server 102, one or more computing devices, such as a user-computing device 104, and a communication network 106. Various devices in the system environment 100 may be interconnected over the communication network 106. FIG. 1 shows, for simplicity, one application server, such as the data processing server 102, and one computing device, such as the user-computing device 104. However, it will be apparent to a person having ordinary skill in the art that the disclosed embodiments may also be implemented using multiple application servers and multiple computing devices, without departing from the scope of the disclosure.

The data processing server 102 may refer to a computing device or a software framework hosting an application or a software service that may be communicatively coupled to the communication network 106. In an embodiment, the data processing server 102 may be implemented to execute procedures, such as, but not limited to, programs, routines, or scripts stored in one or more memory units for supporting the hosted application or the software service. In an embodiment, the hosted application or the software service may be configured to perform one or more predetermined operations for text classification based on learning of transferable feature representations from the source domain for the target domain. In an embodiment, the data processing server 102 may be configured to receive a request for classification of unlabeled instances of a target domain. In an embodiment, the request may include the unlabeled instances of the target domain and labeled instances of a source domain (or a plurality of source domains). In another embodiment, the data processing server 102 may be configured to retrieve the labeled instances of the source domain (or the plurality of source domains) from one or more social media websites or a database server (not shown). The unlabeled instances of the target domain and the labeled instances of the source domain (or the plurality of source domains) may correspond to real time input data.

The data processing server 102 may be further configured to determine source specific representation corresponding to the source domain and a common representation between the source domain and the target domain. The source specific representation may refer to features (such as keywords, graphical characters, and/or the like) extracted from the labeled instances (such as a text segment, an audio segment, and/or the like) of the source domain that are used specifically in accordance with the source domain. The common representation may refer to features (such as keywords, graphical characters, and/or the like) extracted from the labeled instances (such as a text segment, an audio segment, and/or the like) of the source domain that are used in the source domain as well as in the target domain.

In an embodiment, the data processing server 102 may be further configured to learn the common representation for minimizing a domain divergence in the common representation to acquire domain independence. The data processing server 102 may use one or more techniques, such as stochastic gradient descent technique, to acquire domain independence. The data processing server 102 may be configured to learn the source specific representation and the common representation for minimizing a source classification error of the data processing server 102. The source classification error may correspond to an error in classification of the labeled instances of the source domain. The data processing server 102 may use one or more techniques, such as the stochastic gradient descent technique, known in the art for the minimization of the source classification error. However, a person having ordinary skill in the art will appreciate that the usage of words, such as minimize, maximize, optimize, and/or any other similar words, in the disclosure are to be construed broadly within the ongoing practical context, and should not be construed as yielding a provable mathematical maximum or optimum solution.

Thereafter, the data processing server 102 may be configured to classify the labeled instances of the source domain based on positive contribution from the source specific representation and the common representation. The data processing server 102 may classify the labeled instances of the source domain into a plurality of categories associated with the source domain with minimum source classification error. The data processing server 102 may be further configured to train a generalized classifier based on positive contribution from the common representation. The trained generalized classifier may be domain independent.

In an embodiment, the data processing server 102 may be configured to automatically perform the classification (such as a text classification) on the unlabeled instances of the target domain based on the trained generalized classifier. The generalized classifier may associate a label from a plurality of target labels with each of the unlabeled instances of the target domain. In an embodiment, the data processing server 102 may be further configured to render the result of the classification (such as the text classification) automatically performed on the unlabeled instances of the target domain at a user interface of the user-computing device 104, via the communication network 106.

The data processing server 102 may be realized through various types of application servers, such as, but not limited to, a Java application server, a .NET framework application server, a Base4 application server, a PHP framework application server, or any other application server framework. An embodiment of the structure of the data processing server 102 has been discussed later in FIG. 2.

The user-computing device 104 may refer to a computing device (associated with a user) that may be communicatively coupled to the communication network 106. The user-computing device 104 may include one or more processors and one or more memory units. The one or more memory units may include a computer readable code that may be executable by the one or more processors to perform one or more operations specified by the user (not shown). In an embodiment, the user may utilize the user-computing device 104 to transmit the request to the data processing server 102 for classification of the unlabeled instances of the target domain. Examples of the unlabeled instances of the target domain may include, but are not limited to, unlabeled images, unlabeled text segments, and/or unlabeled audio segments. In an embodiment, the user may transmit the unlabeled instances of the target domain and the labeled instances associated with the source domain (or the plurality of source domains) along with the request to the data processing server 102. Examples of the labeled instances of the source domain may include, but are not limited to, labeled images, labeled text segments, and/or labeled audio segments. In an embodiment, each of the labeled instances of the source domain may be associated with a label from a plurality of labels associated with the source domain. The user-computing device 104 may correspond to a variety of computing devices, such as, but not limited to, a laptop, a PDA, a tablet computer, a smartphone, and a phablet.

A person having ordinary skill in the art will understand that the scope of the disclosure is not limited to the utilization of the user-computing device 104 by a single user. In an embodiment, the user-computing device 104 may be utilized by more than one users to transmit the classification request. Further, the scope of the disclosure is not limited to realizing the data processing server 102 and the user-computing device 104, as separate entities. In an embodiment, the data processing server 102 may be realized as an application program installed on and/or running on the user-computing device 104, without deviating from the scope of the disclosure.

The communication network 106 may correspond to a medium through which content and messages flow between various devices, such as the data processing server 102 and the user-computing device 104, of the system environment 100. Examples of the communication network 106 may include, but are not limited to, the Internet, a cloud network, a Wireless Fidelity (Wi-Fi) network, a Wireless Local Area Network (WLAN), a Local Area Network (LAN), a wireless personal area network (WPAN), a wireless wide area network (WWAN), a cloud network, a Long Term Evolution (LTE) network, a plain old telephone service (POTS), and/or a Metropolitan Area Network (MAN). Various devices in the system environment 100 can connect to the communication network 106 in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, enhanced data rates for GSM evolution (EDGE), infrared (IR), IEEE 802.11, 802.16, cellular communication protocols, such as Long Term Evolution (LTE), Light Fidelity (Li-Fi), and/or other cellular communication protocols or Bluetooth (BT) communication protocols.

Figure 2:
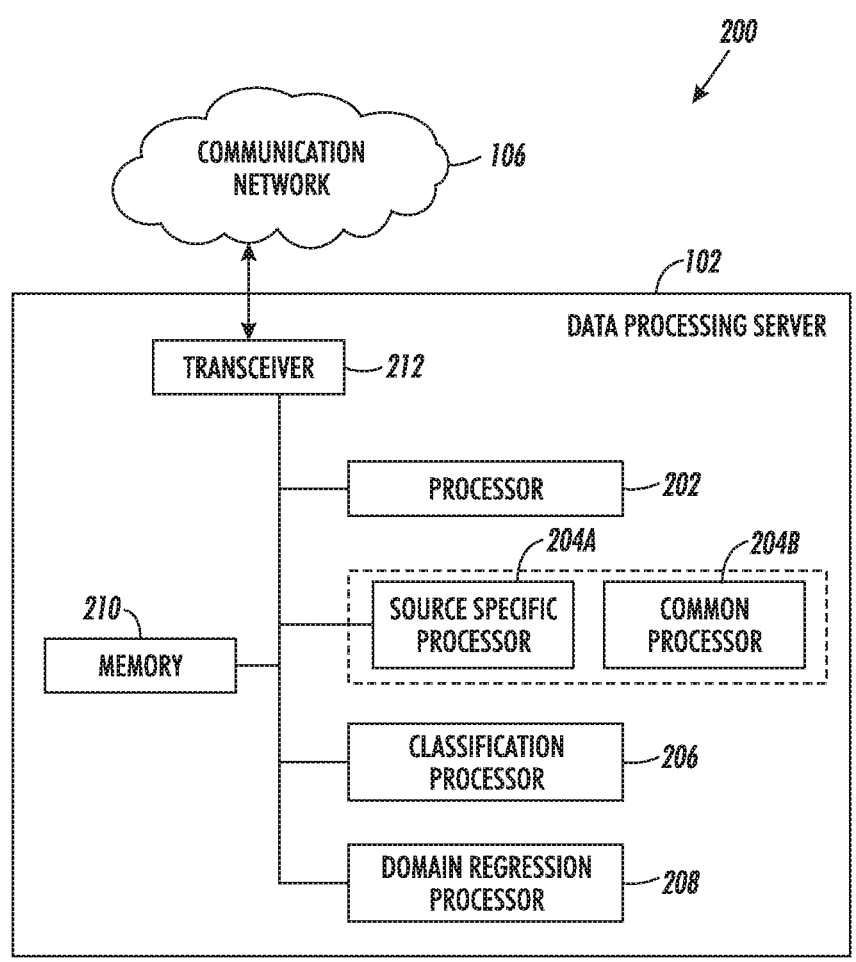
FIG. 2 is a block diagram that illustrates a data processing server, in accordance with at least one embodiment.

FIG. 2 is a block diagram that illustrates an application server, in accordance with at least one embodiment. FIG. 2 has been described in conjunction with FIG. 1. With reference to FIG. 2, there is shown a block diagram of an application server (such as the data processing server 102) that may include a processor 202, a source specific processor 204A, a common processor 204B, a classification processor 206, a domain regression processor 208, a memory 210, and a transceiver 212. The processor 202 is communicatively coupled to the source specific processor 204A, the common processor 204B, the classification processor 206, the domain regression processor 208, the memory 210, and the transceiver 212.

The processor 202 includes suitable logic, circuitry, and/or interfaces that are configured to execute one or more instructions stored in the memory 210. The processor 202 may further comprise an arithmetic logic unit (ALU) (not shown) and a control unit (not shown). The ALU may be coupled to the control unit. The ALU may be configured to perform one or more mathematical and logical operations and the control unit may control the operation of the ALU. The processor 202 may execute a set of instructions/programs/codes/scripts stored in the memory 210 to perform one or more operations for text classification based on learning of transferable feature representations from a source domain for a target domain. The processor 202 may be implemented based on a number of processor technologies known in the art. Examples of the processor 202 may include, but are not limited to, an X86-based processor, a Reduced Instruction Set Computing (RISC) processor, and/or a Complex Instruction Set Computing (CISC) processor. In an alternate embodiment, the processor 202 may be implemented as an Application-Specific Integrated Circuit (ASIC) processor specially configured for training of classifiers for various target domains.

The source specific processor 204A may comprise suitable logic, circuitry, interfaces, and/or code that may be configured to execute one or more instructions stored in the memory 210. In an embodiment, the source specific processor 204A may be configured to determine the source specific representation corresponding to the source domain. Examples of the source specific processor 204A may include, but are not limited to, an X86-based processor, a RISC processor, an ASIC processor, a CISC processor, and/or another processor.

The common processor 204B may comprise suitable logic, circuitry, interfaces, and/or code that may be configured to execute one or more instructions stored in the memory 210. In an embodiment, the common processor 204B may be configured to determine the common representation between the source domain and the target domain. In an embodiment, the common processor 204B may be configured to maximize a loss in the classification ability of the domain regression processor 208 by use of one or more techniques, such as the stochastic gradient descent technique, known in the art. Examples of the common processor 204B may include, but are not limited to, an X86-based processor, a RISC processor, an ASIC processor, a CISC processor, and/or another processor.

A person having ordinary skill in the art will appreciate that the scope of the disclosure is not limited to realizing the source specific processor 204A, the common processor 204B, and the processor 202 as separate entities. In an embodiment, the functionalities of the source specific processor 204A and the common processor 204B may be implemented within the processor 202, without departing from the spirit of the disclosure. Further, a person skilled in the art will understand that the scope of the disclosure is not limited to realizing the source specific processor 204A and the common processor 204B as hardware components. In an embodiment, the source specific processor 204A and the common processor 204B may be implemented as software modules included in computer program code (stored in the memory 210), which may be executable by the processor 202 to perform the functionalities of the source specific processor 204A and the common processor 204B.

The classification processor 206 may comprise suitable logic, circuitry, interfaces, and/or code that may be configured to execute one or more instructions stored in the memory 210. In an embodiment, the classification processor 206 may be configured to learn the source specific representation and the common representation for minimizing a source classification error. The classification processor 206 may be further configured to classify the labeled instances of the source domain based on the source specific representation and the common representation with minimum source classification error. Examples of the classification processor 206 may include, but are not limited to, an X86-based processor, a RISC processor, an ASIC processor, a CISC processor, and/or another processor.

A person having ordinary skill in the art will appreciate that the scope of the disclosure is not limited to realizing the classification processor 206 and the processor 202 as separate entities. In an embodiment, the functionalities of the classification processor 206 may be implemented within the processor 202, without departing from the spirit of the disclosure. Further, a person skilled in the art will understand that the scope of the disclosure is not limited to realizing the classification processor 206 as a hardware component. In an embodiment, the classification processor 206 may be implemented as software module included in computer program code (stored in the memory 210), which may be executable by the processor 202 to perform the functionalities of the classification processor 206.

The domain regression processor 208 may comprise suitable logic, circuitry, interfaces, and/or code that may be configured to execute one or more instructions stored in the memory 210. In an embodiment, the domain regression processor 208 may be configured to predict a probability that an instance is from the source domain or the target domain. Further, the domain regression processor 208 may be configured to learn the common representation for minimizing a domain divergence in the common representation. Thus, the domain regression processor 208 may be domain independent. In an embodiment, in case of a single source domain, the domain regression processor 208 may be configured to train the generalized classifier based on positive contribution from the common representation. In an alternative embodiment, in case of a multiple source domains, the domain regression processor 208 may be configured to train the generalized classifier based on positive contribution from the common representation, global representation, and source representation common between each source-target pair. Examples of the domain regression processor 208 may include, but are not limited to, an X86-based processor, a RISC processor, an ASIC processor, a CISC processor, and/or another processor.

A person having ordinary skill in the art will appreciate that the scope of the disclosure is not limited to realizing the domain regression processor 208 and the processor 202 as separate entities. In an embodiment, the functionalities of the domain regression processor 208 may be implemented within the processor 202, without departing from the spirit of the disclosure. Further, a person skilled in the art will understand that the scope of the disclosure is not limited to realizing the domain regression processor 208 as a hardware component. In an embodiment, the domain regression processor 208 may be implemented as software module included in computer program code (stored in the memory 210), which may be executable by the processor 202 to perform the functionalities of the domain regression processor 208.

The memory 210 may be operable to store one or more machine codes, and/or computer programs having at least one code section executable by the processor 202. The memory 210 may store the one or more sets of instructions that are executable by the processor 202, the source specific processor 204A, the common processor 204B, the classification processor 206, the domain regression processor 208, and the transceiver 212. In an embodiment, the memory 210 may include one or more buffers (not shown). In an embodiment, the one or more buffers may be configured to store the source specific representation, the common representation, the global representation, and the source representation common between each source-target pair. The memory 210 may be further configured to store the trained generalized classifier. In an embodiment, the one or more buffers may be further configured to store the classified labeled source instances and the classified labeled target instances. Examples of some of the commonly known memory implementations may include, but are not limited to, a random access memory (RAM), a read only memory (ROM), a hard disk drive (HDD), and a secure digital (SD) card. In an embodiment, the memory 210 may include machine code and/or computer programs that are executable by the processor 202 to perform specific operations for text classification based on learning of transferable feature representations from a source domain for a target domain. It will be apparent to a person having ordinary skill in the art that the one or more instructions stored in the memory 210 may enable the hardware of the data processing server 102 to perform the one or more predetermined operations, without deviating from the scope of the disclosure.

The transceiver 212 transmits/receives messages and data to/from various components, such as the user-computing device 104 of the system environment 100, over the communication network 106. In an embodiment, the transceiver 212 may be communicatively coupled to the communication network 106. In an embodiment, the transceiver 212 may be configured to receive the request from the user-computing device 104 to perform text classification based on learning of transferable feature representations from the source domain for the target domain. In an embodiment, the transceiver 212 may be further configured to transmit the trained generalized classifier to the database server (not shown) for storage. In an embodiment, the transceiver 212 may be further configured to transmit the result of automatic classification performed on the unlabeled instances of the target domain to the user-computing device 104. The transceiver 212 may implement one or more known technologies to support wired or wireless communication with the communication network 106. In an embodiment, the transceiver 212 may include circuitry, such as, but not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 212 may communicate via wireless communication with networks, such as the Internet, an Intranet and/or a wireless network, such as a cellular telephone network, a WLAN and/or a MAN. The wireless communication may use any of a plurality of communication standards, protocols, and technologies, such as: Global System for Mobile Communications (GSM), EDGE, wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, and a protocol for email, instant messaging, and/or Short Message Service (SMS).

The working of the data processing server 102 for text classification based on learning of transferable feature representations from a source domain for a target domain has been explained later in FIGS. 3 and 4.

Figure 3:
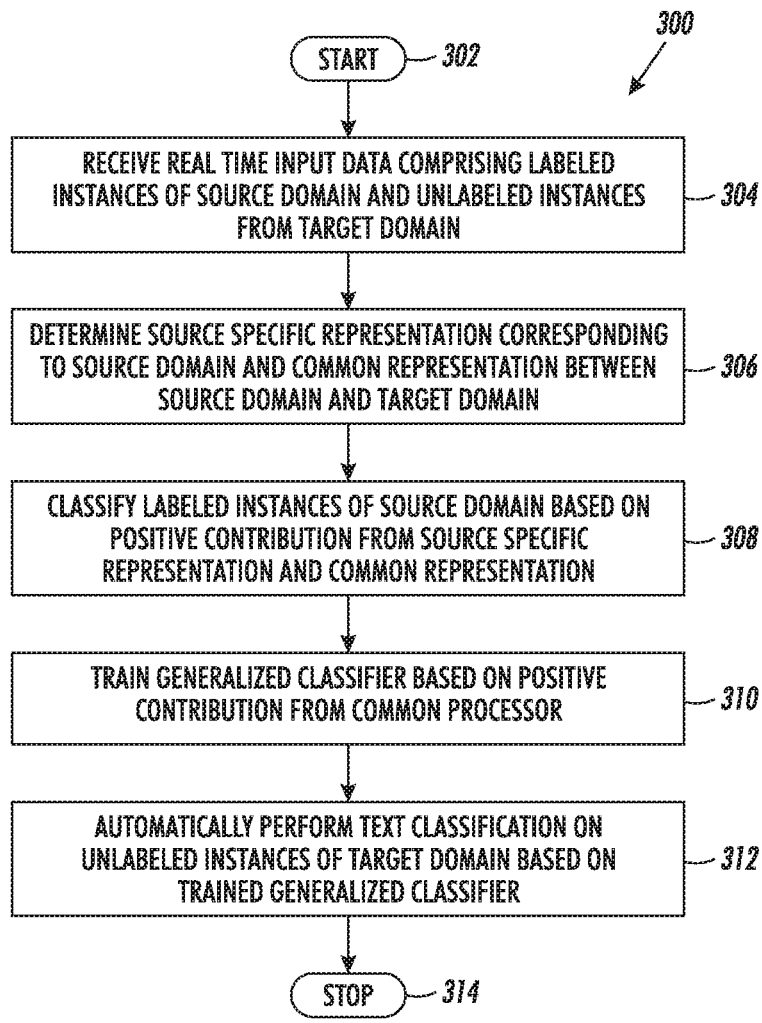
FIG. 3 depicts a flowchart that illustrates a domain adaptation method for text classification based on learning of transferable feature representations from a source domain for a target domain, in accordance with at least one embodiment.

FIG. 3 depicts a flowchart that illustrates a domain adaptation method of text classification based on learning of transferable feature representations from a source domain for a target domain, in accordance with at least one embodiment. FIG. 3 is described in conjunction with FIG. 1 and FIG. 2. With reference to FIG. 3, there is shown a flowchart 300 that illustrates a domain adaptation method of text classification based on learning of transferable feature representations from a source domain for a target domain. A person having ordinary skill in the art will understand that the examples, as described in FIG. 3, are for illustrative purpose and should not be construed to limit the scope of the disclosure. The domain adaptation method starts at step 302 and proceeds to step 304.

At step 304, real time input data comprising labeled instances of source domain and unlabeled instances from target domain is received. In an embodiment, the processor 202 may be configured to receive the real time input data comprising labeled instances of the source domain and the unlabeled instances of the target domain from the user-computing device 104 by use of the transceiver 212, via the communication network 106.

In an embodiment, the labeled instances of the source domain may correspond to labeled images, labeled text segments, and/or labeled audio segments. In an embodiment, the labeling of the instances of the source domain may be performed manually by one or more users (not shown). The one or more users may label the instances of the source domain for a plurality of categories associated with the source domain. For example, the instances of the source domain may correspond to text segments and the plurality of categories of the source domain may include a positive category and a negative category. Thus, the one or more users may label the instances of the source domain with either a "positive" label or a "negative" label. The one or more users may label the instances of the source domain based on one or more criteria associated with the plurality of categories. For example, a criteria associated with the plurality of categories may correspond to a type of emotion, such as positive emotion or negative emotion. The positive category may be associated with the positive emotion and the negative category may be associated with negative emotion. Thus, a user in the one or more users may label a text segment of the source domain with a "positive" label, if the text segment depicts positive emotion and the user may further label another text segment of the source domain with a "negative" label, if the text segment depicts negative emotion. In an embodiment, the unlabeled instances of the target domain may correspond to unlabeled images, unlabeled text segments, and/or unlabeled audio segments.

A person having ordinary skill in the art will understand that the scope of the disclosure is not limited to the labeling of the instances of a source domain based on a type of emotion. Any other criteria, such as parts of speech labeling and/or the like, may also be used for the labeling of instances of a source domain.

In an exemplary scenario, the real time input data received from the user-computing device 104 may constitute an input layer of a neural network. The labeled instances (S) of the source domain ($D_S$) may be represented by equation (1) and the unlabeled instances (T) of the target domain ($D_T$) may be represented by equation (2), as shown below:

$$S=\{(x_i^s, y_i^s)\}_{i=1}^{m} \quad (1)$$

where, $x_i^s$ represents an $i^{th}$ labeled instance of the source domain ($D_S$);

$y_i^s$ represents a label of the $i^{th}$ labeled instance of the source domain ($D_S$); and m represents a count of the labeled instances of the source domain ($D_S$).

$$T=\{(x_i^t)\}_{i=1}^{m'} \quad (2)$$

where, $x_i^t$ represents an $i^{th}$ unlabeled instance of the target domain ($D_T$); and m' represents a count of the unlabeled instances of the target domain ($D_T$).

A person having ordinary skill in the art will understand that the abovementioned exemplary scenario is for illustrative purpose and should not be construed to limit the scope of the disclosure.

At step 306, the source specific representation corresponding to the source domain and the common representation between the source domain and the target domain is determined. In an embodiment, the source specific processor 204A may be configured to determine the source specific representation corresponding to the source domain and the common processor 204B may be configured to determine the common representation between the source domain and the target domain. In an embodiment, a representation may refer to features, such as keywords, graphical characters, and/or the like, extracted from an instance, such as a text segment, an audio segment, and/or the like. In an embodiment, the source specific representation may correspond to a representation that is specific to the source domain. For example, the source specific representation may include keywords that are used specifically in accordance with the source domain. Further, the common representation may correspond to a representation that is common to the source domain and the target domain. For example, the common representation may include keywords that are used in the source domain as well as in the target domain.

Prior to the determination of the source specific representation and the common representation, the processor 202 may be configured to extract representations (such as features) from the labeled instances of the source domain. For example, the labeled instances of the source domain may correspond to labeled text segments. In this scenario, the processor 202 may extract keywords from the labeled text segments. The extracted keywords may correspond to the representations. The processor 202 may use one or more keywords extraction techniques, such as term frequency-inverse document frequency (TF-IDF) technique, known in the art for the extraction of keywords from the labeled text segments. Thereafter, the source specific processor 204A and the common processor 204B may be configured to determine the source specific representation and the common representation, respectively, from the extracted representations. For example, the source specific processor 204A may determine the keywords that are present in the labeled instances of the source domain only and have a TF-IDF score greater than a predefined threshold. The predefined threshold may be specified by the user. The keywords determined by the source specific processor 204A may constitute the source specific representation of the source domain. Further, the common processor 204B may determine the keywords that are present in both the labeled instances of the source domain and the unlabeled instances of the target domain, and have a TF-IDF score greater than the predefined threshold. The keywords determined by the common processor 204B may constitute the common representation of the source domain.

In an exemplary scenario, the determined source specific representation and the determined common representation may collectively constitute a hidden layer of the neural network. Further, the hidden layer (i.e., including the source specific representation and the common representation) may be connected to the input layer (i.e., including the labeled instances of the source domain and the unlabeled instances of the target domain). The hidden layer (h(x)) of the neural network may be represented by equation (3), as shown below:

$$h(x)=h_{ss}(x)+h_c(x) \quad (3)$$

where, $h_{ss}(x)$ represents the source specific representation included in the hidden layer (h(x)) of the neural network; and $h_c(x)$ represents the common representation included in the hidden layer (h(x)) of the neural network.

A person having ordinary skill in the art will understand that the abovementioned exemplary scenario is for illustrative purpose and should not be construed to limit the scope of the disclosure.

In an embodiment, the domain regression processor 208 may be configured to learn the common representation for minimizing a domain divergence in the common representation, after the determination of the common representation. In an embodiment, the domain regression processor 208 may be configured to predict a probability that an instance is from the source domain or the target domain. Based on the predicted probability, the domain regression processor 208 may classify real time input data (i.e., the labeled source instances or unlabeled target instances) into the source domain or the target domain. Further, the domain regression processor 208 may be configured to determine the domain divergence between a source sample representation and a target sample representation provided based on the prediction. The source sample representation and the target sample representation may be included in the common representation provided by the common processor 204B. Thereafter, for minimizing the determined domain divergence in the common representation (i.e., the source sample representation and the target sample representation), a loss in the classification ability of the domain regression processor 208 is to be maximized. In an embodiment, the common processor 204B may be configured to maximize the loss in the classification ability of the domain regression processor 208. The common processor 204B may use one or more techniques, such as stochastic gradient descent technique, known in the art for the maximization of the loss in the classification ability of the domain regression processor 208.

For example, by use of stochastic gradient descent technique one or more parameters associated with the domain regression processor 208 are updated based on a labeled source instance and an unlabeled source instance in the input data. The one or more parameters associated with the domain regression processor 208 are updated based on a direction of a gradient for the common representation provided by the common processor 204B. Further, the one or more parameters associated with the domain regression processor 208 are updated based on a negative direction of a gradient for the source specific representation provided by the source specific processor 204A. In other words, the contribution of the source specific representation provided by the source specific processor 204A in the learning of the domain regression processor 208 may be penalized. Thus, the loss in the classification ability of the domain regression processor 208 is maximized. Further, the common processor 204B and the domain regression processor 208 may acquire domain independence by the maximization of the loss in the classification ability of the domain regression processor 208. The maximized loss in the classification ability of the domain regression processor 208 may be represented by equation (4), as shown below:

$$\max_{W',u,b,d}\left(-\frac{1}{m}\sum_{i=1}^{m}L^d(o(x_i^s),1)-\frac{1}{m'}\sum_{i=1}^{m'}L^d(o(x_i^t),0)\right) \quad (4)$$

where,

W' and b represents one or more parameters of the neural network;

u and d represents the one or more parameters (i.e., adversarial parameters) of the domain regression processor 208;

o(•) represents a function by use of which the domain regression processor 208 classifies input data;

$$-\frac{1}{m}\sum_{i=1}^{m}L^d(o(x_i^s),1)$$

represents a loss in the classification ability of the domain regression processor 208 for the source sample representation, where $L^d(o(x_i^s),1)=-\log(o(x_i^s))$; and $\sum_{i=1}^{m'}L^d(o(x_i^t),0)$ represents a loss in the classification ability of the domain regression processor 208 for the target sample representation, where $L^d(o(x_i^t),0)=-\log(1-o(x_i^s))$.

However, a person having ordinary skill in the art will appreciate that the usage of words, such as minimize, maximize, optimize, and/or any other similar words, in the disclosure are to be construed broadly within the ongoing practical context, and should not be construed as yielding a provable mathematical maximum or optimum solution.

In an embodiment, the classification processor 206 may be configured to learn the source specific representation and the common representation for minimizing the source classification error, after the determination of the source specific representation and the common representation. The source classification error may correspond to an error in classification of the labeled instances of the source domain. The classification processor 206 may use one or more techniques, such as the stochastic gradient descent technique, known in the art for the minimization of the source classification error. For example, by use of the stochastic gradient descent technique, the classification processor 206 may ensure that the source specific representation and the common representation contribute positively to the source classification error. In other words, update of one or more parameters associated with the classification processor 206 may be based on a negative direction of gradient for the source specific representation and the common representation. Thus, the source classification error may be minimized. The minimized source classification error may be represented by equation (5), as shown below:

$$\min_{W,V,b,c}\left[\frac{1}{m}\sum_{i=1}^{m}L(f(x_i^s),y_i^s)\right] \quad (5)$$

where,

W, V, b, c represents the one or more parameters associated with the classification processor 206;

$f(x_i^s)$ represents a function by use of which the classification processor 206 classifies a labeled or unlabeled source instance $(x_i^s)$ to label $y_i^s$; and $$\frac{1}{m}\sum_{i=1}^{m}L(f(x_i^s),y_i^s)$$

represents the source classification error, where $$L(f(x_i^s), y_i^s) = \log\frac{1}{f_{y_i^s}(x_i^s)}.$$

However, a person having ordinary skill in the art will appreciate that the usage of words, such as minimize, maximize, optimize, and/or any other similar words, in the disclosure are to be construed broadly within the ongoing practical context, and should not be construed as yielding a provable mathematical maximum or optimum solution.

At step 308, the labeled instances of the source domain are classified based on positive contribution from the source specific representation and the common representation. In an embodiment, the classification processor 206 may be configured to classify the labeled instances of the source domain based on positive contribution from the source specific representation and the common representation. The classification processor 206 may be configured to classify the labeled instances of the source domain with the minimized source classification error.

In an embodiment, the classification of the labeled instances of the source domain may correspond to a classification of the labeled instances of the source domain into the plurality of categories in accordance with the label associated with each labeled instance. For example, a first instance may be labeled as "positive" and a second instance may be labeled as "negative." In such a case, the first instance may be classified into a first category and the second instance may be classified into a second category. Thus, the classification processor 206 may classify all the labeled instances with the label "positive" into the first category and all the labeled instances with the label "negative" into the second category.

In another embodiment, the classification processor 206 may be further configured to automatically label one or more unlabeled instances of the source domain based on positive contribution from the source specific representation and the common representation. In an exemplary scenario, the classification processor 206 may use the hidden layer of the neural network which comprises the source specific representation and the common representation for the labeling of an unlabeled instance (such as a text segment). The classification processor 206 may extract one or more keywords from the text segment. Thereafter, the classification processor 206 may use the source specific representation and the common representation to determine the label for the text segment. Further, based on the determined label the text segment may be classified in one category of the plurality of categories.

In an embodiment, after labeling of the unlabeled instances of the source domain, the source specific processor 204A and the common processor 204B, in conjunction with the processor 202, may be configured to further determine the source specific representation and the common representation, respectively, from the instances that are labeled. Further, based on the determination of the source specific representation and the common representation, the hidden layer of the neural network may be updated by the source specific processor 204A, and the common processor 204B. In an exemplary scenario, the classified labeled instances of the source domain may correspond to an output layer of the neural network.

At step 310, the generalized classifier is trained based on positive contribution from the common processor. In an embodiment, the domain regression processor 208 may be configured to train the generalized classifier based on positive contribution from the common processor 204B. The common processor 204B may be configured to provide the common representation of the source domain which may be used for training the generalized classifier. Thus, the trained generalized classifier may be domain independent. The common representation provided by the common processor 204B may correspond to training data for the generalized classifier.

At step 312, text classification is performed automatically on the unlabeled instances of the target domain based on the trained generalized classifier. In an embodiment, the processor 202 may be configured to automatically perform the text classification on the unlabeled instances of the target domain based on the trained generalized classifier. The generalized classifier may associate a label from the plurality of target labels with each of the unlabeled instances of the target domain. In an embodiment, the plurality of target labels may be same as the labels associated with the labeled instances of the source domain. In an alternate embodiment, the plurality of target labels may be different from the labels associated with the labeled instances of the source domain.

In an embodiment, the processor 202 may be further configured to render the result of the text classification automatically performed on the unlabeled instances of the target domain at a user interface of the user-computing device 104 over the communication network 106. A user associated with the user-computing device 104 may use the result of the automatic text classification for data analysis. In another embodiment, the result of the automatic text classification of the unlabeled instances of the target domain (i.e., a first target domain) may be further used by the processor 202 to classify unlabeled instances of a second target domain automatically. For example, the processor 202 may use the result of the automatic text classification to perform automatic text classification on a real time text conversation between two users. Control passes to end step 314.

A person having ordinary skill in the art will understand that the scope of the abovementioned flowchart 300 is not limited to automatically perform text classification. In another embodiment, the abovementioned flowchart 300 may be used for performing classification of audio segments, images, and/or the like.

Figure 4:
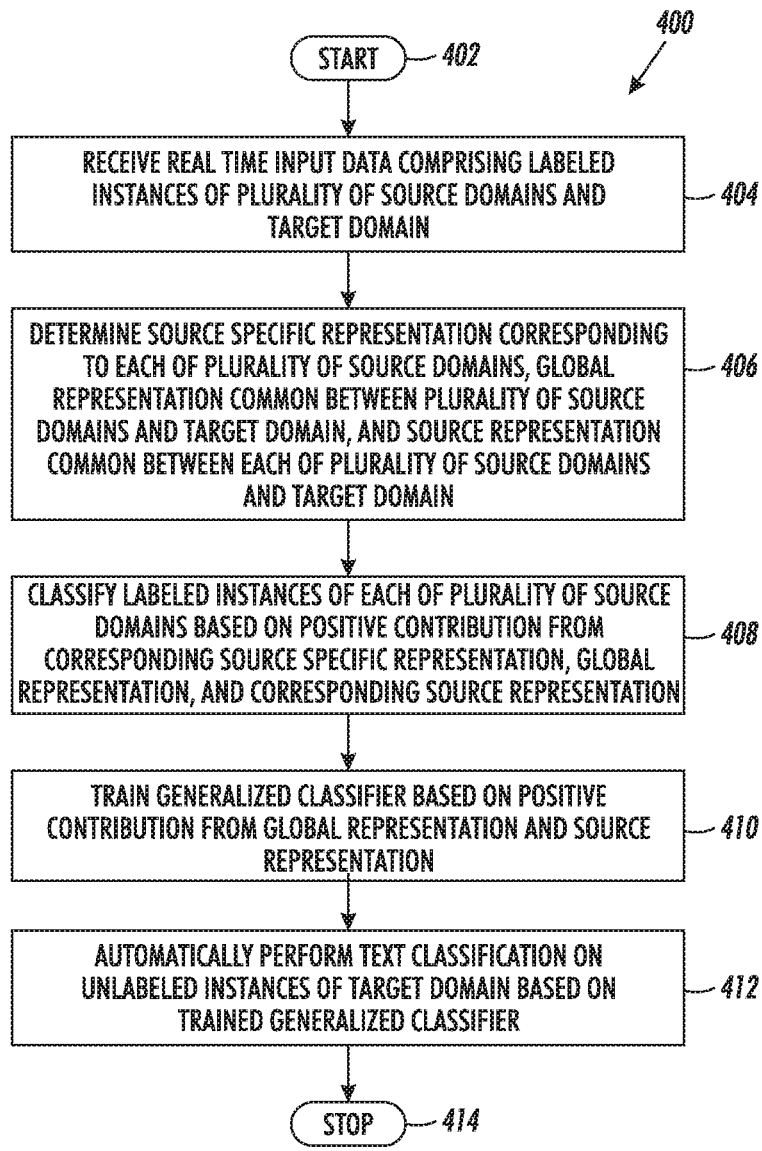
FIG. 4 depicts a flowchart that illustrates a domain adaptation method for text classification based on learning of transferable feature representations from one or more source domains for a target domain, in accordance with at least one embodiment.

FIG. 4 depicts a flowchart that illustrates a domain adaptation method for text classification based on learning of transferable feature representations from a plurality of source domains for a target domain, in accordance with at least one embodiment. FIG. 4 is described in conjunction with FIG. 1, FIG. 2, and FIG. 3. With reference to FIG. 4, there is shown a flowchart 400 that illustrates a domain adaptation method of text classification based on learning of transferable feature representations from a plurality of source domains for a target domain. A person having ordinary skill in the art will understand that the examples, as described in FIG. 4, are for illustrative purpose and should not be construed to limit the scope of the disclosure. The domain adaptation method starts at step 402 and proceeds to step 404.

At step 404, the real time input data comprising labeled instances of the plurality of source domains and unlabeled instances from the target domain is received. In an embodiment, the processor 202 may be configured to receive the real time input data comprising the labeled instances of the plurality of source domains and the unlabeled instances of the target domain from the user-computing device 104 by use of the transceiver 212, via the communication network 106.

In an embodiment, the labeled instances of each source domain of the plurality of source domains may correspond to labeled images, labeled text segments, and/or labeled audio segments. In an embodiment, the labeling of the instances of each source domain of the plurality of source domains may be performed manually by the one or more users. The one or more users may label the instances of each source domain of the plurality of source domains for a plurality of categories associated with each source domain of the plurality of source domains. In an embodiment, the unlabeled instances of the target domain may correspond to unlabeled images, unlabeled text segments, and/or unlabeled audio segments.

In an exemplary scenario, the real time input data received from the user-computing device 104 may constitute an input layer of the neural network. The unlabeled instances (T) of the target domain ($D_T$) may be represented by equation (2) (as previously shown) and the labeled instances ($S_k$) of a $k^{th}$ source domain ($D_{S_k}$) in the plurality of source domains may be represented by equation (6), as shown below:

$$S_k = \{(x_i^{s_k}, y_i^{s_k})\}_{i=1}^m \quad (6)$$

where, $x_i^{s_k}$ represents an $i^{th}$ labeled instance of the source domain ($D_{S_k}$) of the plurality of source domains;

$y_i^{s_k}$ represents a label of the labeled instance of the source domain ($D_{S_k}$) of the plurality of source domains; and m represents a count of the labeled instances of the source domain ($D_{S_k}$).

A person having ordinary skill in the art will understand that the abovementioned exemplary scenario is for illustrative purpose and should not be construed to limit the scope of the disclosure.

At step 406, the source specific representation corresponding to each of the plurality of source domains, global representation common between the plurality of source domains and the target domain, and the source representation common between each of the plurality of source domains and target domain are determined. In an embodiment, the source specific processor 204A may be configured to determine the source specific representation corresponding to each source domain of the plurality of source domains. The common processor 204B may be configured to determine the source representation common between each of the plurality of source domains and target domain pairs. Further, a global processor (not shown) may be configured to determine the global representation common between the plurality of source domains and target domain. A person having ordinary skill in the art will understand that the global processor may correspond to an application specific processor that may comprise suitable logic, circuitry, interfaces, and/or code that may be configured to execute one or more instructions stored in the memory 210 for the determination of the global representation. Examples of the global processor may include, but are not limited to, an X86-based processor, a RISC processor, an ASIC processor, a CISC processor, and/or other processor.

In an embodiment, the source specific representation may correspond to a representation that is specific to a source domain in the plurality of source domains. For example, a plurality of source domains may include two source domains, such as $D_{S_1}$, and $D_{S_2}$. The source specific processor 204A may determine a source specific representation corresponding to each of the two source domains, such as $D_{S_1}$, and $D_{S_2}$. Thus, a count of the source specific representations may be equal to a count of the source domains included in the plurality of source domains. Each source specific representation may include keywords that are used specifically in accordance with the corresponding source domain. Further, the global representation that is common between the plurality of source domains and the target domain may correspond to a representation that is common to between among each source domain of the plurality of source domains and the target domain. For example, the global representation may include keywords that are commonly used in each source domain of the plurality of source domains as well as in the target domain. The source representation common between each of the plurality of source domain and target domain pairs may include representations corresponding to each of the source domain and target domain pair. For example, a plurality of source domains may include two source domains, such as $D_{S_1}$, and $D_{S_2}$. In such a scenario, there may exist two source representations one for each source-target pair.

A person having ordinary skill in the art will understand that the scope of the abovementioned examples is for illustrative purpose and should not be construed to limit the scope of the disclosure.

Prior to the determination of the source specific representations, the global representation, and the source representation common for each source-target pair, the processor 202 may be configured to extract representations (such as features) from the labeled instances of each source domain of the plurality of source domains. For example, the labeled instances of each source domain may correspond to labeled text segments. In this scenario, the processor 202 may extract keywords from the labeled text segments of each source domain. The extracted keywords may correspond to the representations of each source domain. The processor 202 may use one or more keywords extraction techniques, such as TF-IDF technique, known in the art for the extraction of keywords from the labeled text segments. Thereafter, the source specific processor 204A, the global processor, and the common processor 204B may be configured to determine the source specific representations, the global representation, and the source representation common for each source-target pair, respectively, from the extracted representations. For example, the source specific processor 204A may determine the keywords that are present in the labeled instances of each source domain only and have a TF-IDF score greater than a predefined threshold. The keywords determined by the source specific processor 204A corresponding to each source domain may constitute the source specific representation of the corresponding source domain. Further, the global processor may determine the keywords that are present in the labeled instances of each source domain of the plurality of source domains and the unlabeled instances of the target domain, and have a TF-IDF score greater than the predefined threshold. The keywords determined by the global processor may constitute the global representation of the plurality source domains and the target domain. Further, the common processor 204B may determine the keywords that are present in the labeled instances of each source-target pair and have a TF-IDF score greater than the predefined threshold. The keywords determined by the common processor 204B corresponding to each source-target pair may constitute the source representation common for the corresponding source-target pair.

In an exemplary scenario, the determined source specific representations, the global representation, and the source representation common for each source-target pair may collectively constitute the hidden layer of the neural network. Further, the hidden layer (i.e., including the source specific representations, the global representation, and the source representation common for each source-target pair) may be connected to the input layer (i.e., including the labeled instances of the plurality of source domains and the unlabeled instances of the target domain. In this scenario, the hidden layer $\{h(x)\}$) of the neural network may be represented by equation (6), as shown below:

$$h(x) = (h_{ss_1}(x) + h_{ss_2}(x) + \ldots + h_{ss_n}(x)) + (h_{cs_1}(x) + h_{cs_2}(x) + \ldots + h_{cs_n}(x)) + h_g(x) \qquad (6)$$

where, n represents a count of source domains included in the plurality of source domains;

$h_{ss_k}(x)$ represents a source specific representation corresponding to a $k^{th}$ source domain in the plurality of source domains;

$h_{cs_k}(x)$ represents a source representation common between the $k^{th}$ source domain and the target domain; and $h_g(x)$ represents the global representation included in the hidden layer (h(x)) of the neural network.

A person having ordinary skill in the art will understand that the abovementioned exemplary scenario is for illustrative purpose and should not be construed to limit the scope of the disclosure.

In an embodiment, the domain regression processor 208 may be configured to learn the global representation and the source representations for minimizing a domain divergence in the global representation and each source representation corresponding to each source-target pair, after the determination of the global representation and the source representations. In an embodiment, the domain regression processor 208 may be configured to predict a probability that an instance is from a source domain of the plurality of source domains or the target domain. Based on the predicted probability, the domain regression processor 208 may classify real time input data (i.e., the labeled source instances or unlabeled target instances) into a corresponding source domain of the plurality of source domains or the target domain. Further, the domain regression processor 208 may be configured to determine the domain divergence between a pair of a source sample representation and a target sample representation, corresponding to each source-target pair, based on the prediction. The source sample representation and the target sample representation may be provided by the common processor 204B. Thereafter, for minimizing the determined domain divergence in the global representations, and the source representations (i.e., the source sample representation and the target sample representation corresponding to each source-target pair), a loss in the classification ability of the domain regression processor 208 is to be maximized. In an embodiment, the common processor 204B may be configured to maximize the loss in the classification ability of the domain regression processor 208. The common processor 204B may use one or more techniques, such as the stochastic gradient descent technique, known in the art for the maximization of the loss in the classification ability of the domain regression processor 208, as described previously in flowchart 300 (FIG. 3).

In an embodiment, the classification processor 206 may be configured to learn the source specific representations, the global representation, and the source representations for minimizing a source classification error, after the determination of the source specific representations, the global representation, and the source representations. For example, to minimize the source classification error corresponding to a source domain ($D_{S_k}$) in the plurality of source domains, the classification processor 206 may learn the source specific representation corresponding to the source domain ($D_{S_k}$), the global representation, and the source representation corresponding to the source domain ($D_{S_k}$). The classification processor 206 may use one or more techniques, such as the stochastic gradient descent technique, known in the art for the minimization of the source classification error corresponding to each source domain in the plurality of source domains. For example, by use of the stochastic gradient descent technique, the classification processor 206 may ensure that the source specific representation of a source domain ($D_{S_k}$), the global representation, and the source representation of the source domain ($D_{S_k}$) contribute positively to the source classification error of the source domain ($D_{S_k}$). Further, the source representations of the remaining source domains other than the source domain ($D_{S_k}$) in the plurality of source domains may contribute negatively to the source classification error of the source domain ($D_{S_k}$). In other words, update of one or more parameters associated with the classification processor 206 for the source classification error of the source domain ($D_{S_k}$) may be based on a negative direction of gradient for the source specific representation of the source domain ($D_{S_k}$), the global representation, and the source representation of the source domain ($D_{S_k}$). Thus, the source classification error of the classification processor 206 may be minimized for each source domain of the plurality of source domains. The minimized source classification error corresponding to each source domain may be represented by equation (5), as shown previously.

At step 408, the labeled instances of each of the plurality of source domains is classified based on positive contribution from the corresponding source specific representation, the global representation, and the corresponding source representation. In an embodiment, the classification processor 206 may be configured to classify the labeled instances of each source domain in the plurality of source domains based on positive contribution from the corresponding source specific representation, the global representation, and the corresponding source representation. For instance, the classification processor 206 may classify the labeled instances of a source domain ($D_{S_k}$) based on positive contribution from the source specific representation $h_{ss_k}(x)$, the global representation $h_g(x)$, and the source representation $h_{cs_k}(x)$ which is common between the source domain ($D_{S_k}$) and the target domain.

A person having ordinary skill in the art will understand that the abovementioned example is for illustrative purpose and should not be construed to limit the scope of the disclosure.

The classification processor 206 may be configured to classify the labeled instances of each source domain in the plurality of source domains with the minimized source classification error. In an embodiment, the classification of the labeled instances of each source domain in the plurality of source domains may correspond to a classification of the labeled instances of each source domain into the plurality of categories, associated with the corresponding source domain, in accordance with the label associated with each labeled instance. For example, a first instance of a first source domain may be labeled as "positive" and a second instance of the first source domain may be labeled as "negative." In such a case, the first instance may be classified into a first category associated with the first source domain and the second instance may be classified into a second category associated with the first source domain.

Thus, the classification processor 206 may classify all the labeled instances of the first source domain with the label "positive" into the first category and all the labeled instances of the first source domain with the label "negative" into the second category.

In another embodiment, the classification processor 206 may be further configured to automatically label one or more unlabeled instances of each source domain in the plurality of source domains based on positive contribution from the corresponding source specific representation, the global representation, and the corresponding source representation. In an exemplary scenario, the classification processor 206 may use the hidden layer of the neural network which comprises the source specific representations, the global representation, and the source representations common between each of the plurality of source domain and target domain pairs for the labeling of an unlabeled instance (such as a text segment) of a source domain in the plurality of source domains. The classification processor 206 may extract one or more keywords from the text segment. Thereafter, the classification processor 206 may use the corresponding source specific representation, the global representation, and the corresponding source representation to determine the label for the text segment. Further, based on the determined label the text segment may be classified in one category of the plurality of categories that is associated with the source domain.

In an embodiment, after labeling of the unlabeled instances of each source domain in the plurality of source domains, the source specific processor 204A, the global processor, and the common processor 204B, in conjunction with the processor 202, may be configured to further determine the source specific representations, the global representation, and the source representations, respectively, from the instances that are labeled. Further, based on the determination of the source specific representations, the global representation, and the source representations, the hidden layer of the neural network may be updated by the source specific processor 204A, the global processor, and the common processor 204B. In an exemplary scenario, the classified labeled instances of each source domain in the plurality of source domains may correspond to the output layer of the neural network.

At step 410, the generalized classifier is trained based on positive contribution from the global representation and the source representation. In an embodiment, the domain regression processor 208 may be configured to train the generalized classifier based on the positive contribution from the global representation and the source representations. Thus, the trained generalized classifier may be domain independent. The global representation and the source representations provided by the global processor and the common processor 204B may correspond to the training data for the generalized classifier.

At step 412, text classification is performed automatically on the unlabeled instances of the target domain based on the generalized classifier. In an embodiment, the processor 202 may be configured to automatically perform the text classification on the unlabeled instances of the target domain based on the generalized classifier. The generalized classifier may associate a label from the plurality of target labels with each of the unlabeled instances of the target domain. In an embodiment, the plurality of target labels may be same as the labels associated with the labeled instances of a source domain in the plurality of source domains. In an alternate embodiment, the plurality of target labels may be different from the labels associated with the labeled instances of the plurality of source domains.

In an embodiment, the processor 202 may be further configured to render the result of the text classification automatically performed on the unlabeled instances of the target domain at a user interface of the user-computing device 104, over the communication network 106. A user associated with the user-computing device 104 may use the result of the automatic text classification for data analysis. In another embodiment, the result of the automatic text classification of the unlabeled instances of the target domain (i.e., the first target domain) may be further used by the processor 202 to classify unlabeled instances of the second target domain automatically. For example, the processor 202 may use the result of the automatic text classification to perform automatic text classification on a real time text conversation between two users. Control passes to end step 414.

A person having ordinary skill in the art will understand that the scope of the abovementioned flowchart 400 is not limited to automatically perform text classification. In another embodiment, the abovementioned flowchart 400 may be used for performing classification of audio segments, images, and/or the like.

Figure 5:
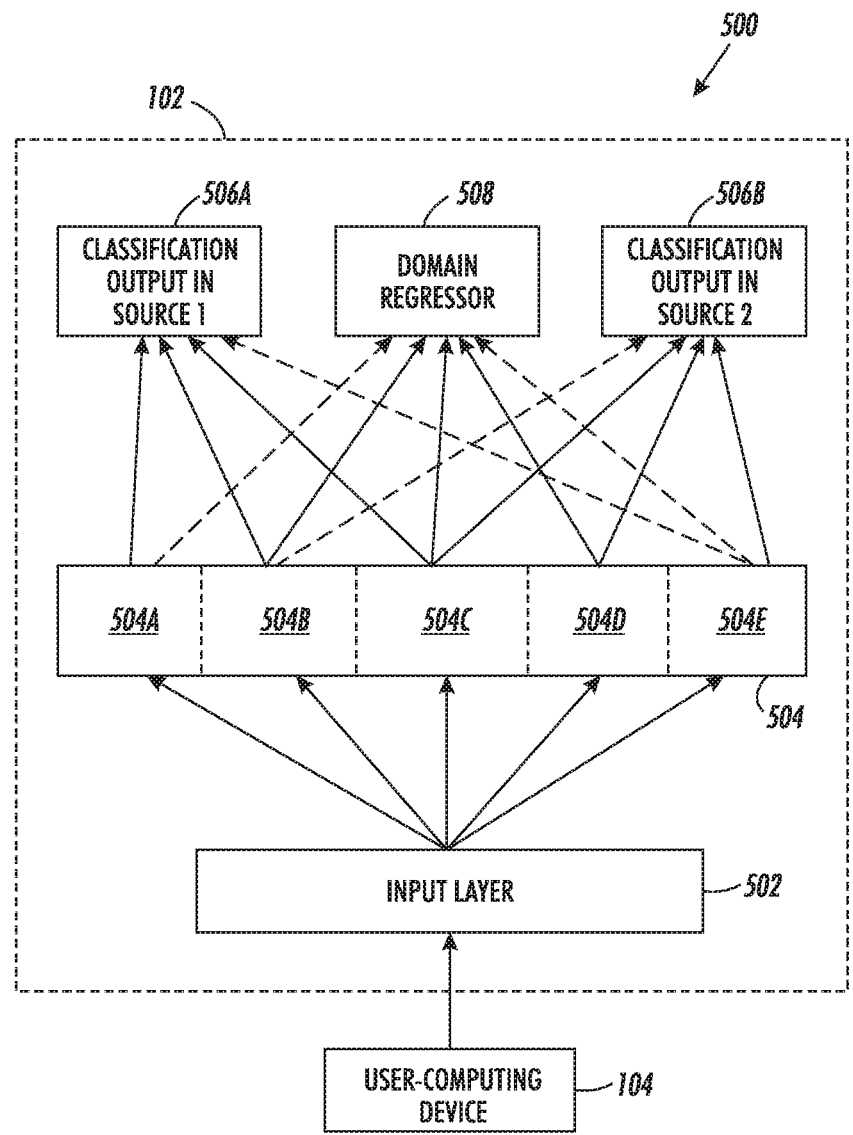
FIG. 5 is a block diagram that illustrates an exemplary scenario for text classification based on learning of transferable feature representations from one or more source domains for a target domain, in accordance with at least one embodiment.

FIG. 5 is a block diagram that illustrates an exemplary scenario for text classification based on learning of transferable feature representations from a plurality of source domains for a target domain, in accordance with at least one embodiment. FIG. 5 is described in conjunction with FIGS. 1 to 4. With reference to FIG. 5, there is shown an exemplary scenario 500 that includes the data processing server 102 and the user-computing device 104. The data processing server 102 includes an input layer 502, a hidden layer 504, two output layers 506A ("CLASSIFICATION OUTPUT IN SOURCE 1") and 506B ("CLASSIFICATION OUTPUT IN SOURCE 2"), and a domain regressor 508. For the sake of brevity below mentioned exemplary scenario 500 is explained with respect to two source domains (such as "SOURCE 1" and "SOURCE 2") included in the plurality of source domains. It may be understood that the scope of the abovementioned exemplary scenario 500 is not limited to only two source domains. In another embodiment, the abovementioned exemplary scenario 500 may include only one source domain, and in yet another embodiment, the abovementioned exemplary scenario 500 may include more than two source domains, without deviating from the scope of the disclosure.

A user (not shown) may use the user-computing device 104 to transmit a first plurality of labeled text segments associated with a source domain (such as "SOURCE 1") and a second plurality of labeled text segments associated with another source domain (such as "SOURCE 2") to the data processing server 102. The user may have extracted the first plurality of labeled text segments and the second plurality of labeled text segments from one or more social media websites (not shown). The user may further transmit a plurality of unlabeled text segments associated with a target domain (such as "TARGET 1"). The plurality of unlabeled text segments associated with the target domain (such as "TARGET 1") may correspond to a plurality of text messages exchanged between two users involved in a real time text conversation. The user may want to classify the plurality of unlabeled text segments associated with the target domain based on the first plurality of labeled text segments and the second plurality of labeled text segments. The first plurality of labeled text segments, the second plurality of labeled text segments, and the plurality of unlabeled text segments may correspond to the real time input data.

After the reception of the real time input data, the data processing server 102 may be configured to formulate a neural network for the classification of the plurality of unlabeled text segments associated with the target domain. The data processing server 102 may determine the input layer 502 of the neural network based on the real time input data. The data processing server 102 may further determine a source specific representation corresponding to each of the plurality of source domains (such as "SOURCE 1" and "SOURCE 2"), a global representation common between the plurality of source domains and the target domain, and a source representation common between each source-target pair, such as ("SOURCE 1," "TARGET 1") and ("SOURCE 2," "TARGET 1"). A source specific representation corresponding to a source domain (such as "SOURCE 1" or "SOURCE 2") may include a first plurality of keywords extracted from labeled text segments (such as the first plurality of labeled text segments or the second plurality of labeled text segments) that are specific to the corresponding source domain. A global representation may include a second plurality of keywords, extracted from the plurality of labeled text segments (such as the first plurality of labeled text segments and the second plurality of labeled text segments) of the plurality of source domains, which are common among the plurality of labeled text segments of the plurality of source domains and the plurality of unlabeled text segments of the target domain. Further, each source representation corresponding to each source-target pair (such as {"SOURCE 1," "TARGET 1"} and {"SOURCE 2," "TARGET 1"}) may include a third plurality of keywords that are common between the plurality of labeled text segments (such as the first plurality of labeled text segments and the second plurality of labeled text segments) of the corresponding source domain and the plurality of unlabeled text segments of the target domain.

Thereafter, the data processing server 102 may determine the hidden layer 504 based on the determined source specific representation corresponding to each of the plurality of source domains, the global representation, and the source representation common between each source-target pair. The hidden layer 504 may include a first section 504A, a second section 504B, a third section 504C, a fourth section 504D, and a fifth section 504E. The first section 504A of the hidden layer 504 may include the source specific representation of the source domain (such as "SOURCE 1") and the second section 504B may include the source representation common between the source-target pair (such as "SOURCE 1" and "TARGET 1"). The third section 504C may include the global representation common between the plurality of source domains (such as "SOURCE 1," "SOURCE 2"), and the target domain (such as "TARGET 1"), the fourth section 504D may include the source representation common between the source-target pair (such as "SOURCE 2" and "TARGET 1"), and the fifth section 504E may include the source specific representation of the source domain (such as "SOURCE 2"). Each section of the hidden layer 504 may be associated with the input layer 502. The association between each section of the hidden layer 504 and the input layer 502 is depicted by arrows directed from the input layer 502 towards each section of the hidden layer 504.

The data processing server 102 may further use the hidden layer 504 for the classification of the first plurality of labeled text segments, the second plurality of labeled text segments, and the plurality of unlabeled text segments. The first section 504A, the second section 504B, and the third section 504C of the hidden layer 504 may contribute positively to the classification of the first plurality of labeled text segments. The positive contribution of the first section 504A, the second section 504B, and the third section 504C in the classification of the first plurality of labeled text segments is depicted by solid lines directed from each of the first section 504A, the second section 504B, and the third section 504C towards the output layer 506A ("CLASSIFICATION OUTPUT IN SOURCE 1"). The fourth section 504D and the fifth section 504E may have a penalized contribution in the classification of the first plurality of labeled text segments. The penalized contribution of the fifth section 504E in the classification of the first plurality of labeled text segments is depicted by dashed lines directed from the fifth section 504E towards the output layer 506A ("CLASSIFICATION OUTPUT IN SOURCE 1"). Similarly, for the classification of the second plurality of labeled text segments, the third section 504C, the fourth section 504D, and the fifth section 504E may have a positive contribution (as depicted by solid lines), and the first section 504A and the second section 504B may have a penalized (or negative) contribution (as depicted by dashed lines).

The data processing server 102 may further use the hidden layer 504 for the training of a generalized classifier based on the domain regressor 508. The data processing server 102 may acquire domain independence for the domain regressor 508 based on a penalized contribution of the first section 504A and the fifth section 504E of the hidden layer 504 during the learning of the domain regressor 508. The penalized contribution of the first section 504A and the fifth section 504E in the learning of the domain regressor 508 is depicted by dashed lines directed from each of the first section 504A and the fifth section 504E towards the domain regressor 508. The domain regressor 508 may train the generalized classifier based on the second section 504B, the third section 504C and the fourth section 504D of the hidden layer 504. Thereafter, the data processing server 102 may use the trained generalized classifier to automatically perform text classification on the plurality of unlabeled text segments of the target domain in real time. The data processing server 102 may further render the result of the automatic text classification through a user interface on the display screen of the user-computing device 104 to be presented to the user.

In an embodiment, the data processing server 102 may further use the formulated neural network for the classification of unlabeled text segments of the plurality of source domains. The data processing server 102 may further update the hidden layer 504 based on the text segments of the plurality of source domains that are labeled by the use of the formulated neural network.

A person having ordinary skill in the art will understand that the scope of the abovementioned exemplary scenario 500 is not limited to the plurality of source domains. In an embodiment, the data processing server 102 may formulate the neural network for one source domain (such as "SOURCE 1") and one target domain. In this scenario, the first section 504A and the second section 504B may only be present in the hidden layer 504 and the third section 504C, the fourth section 504D, and the fifth section 504E may be absent in the hidden layer 504.

The disclosed embodiments encompass numerous advantages. The disclosure provides a domain adaptation method and a system for text classification based on learning of transferable feature representations from a source domain for a target domain. The disclosed domain adaptation method and system mitigates effects of negative transfer of domain specific features (resulted due to learning a common representation for transferring knowledge from the source to the target domain) by learning common representations as well as domain specific features for text classification. Thus, the disclosed domain adaptation method and a system learns common representation while simultaneously minimizing the effect of domain specific features. This leads to an enhanced and efficient domain adaptation performance of the system. The disclosed domain adaptation method and system further learns transferable representations from across multiple sources by simultaneously optimizing for domain specific and the domain divergence objectives. The effectiveness of the proposed neural network architecture to learn domain specific and common representation is evaluated for a cross-domain text classification problem. In the disclosed domain adaptation method and system, the domain specific representation is well segregated from the common representation which leads to improved generalization to the target domain.

The disclosed domain adaptation method and system for learning transferable representations between two domains may be extended to multiple domains and leverage additional complementary information from different domains for enhanced adaptation performance. The disclosed domain adaptation method and system with one hidden layer performs better (or comparable to) than other deep architecture which do not explicitly exclude the domain specific representations from the common shared representations. However, the disclosed domain adaptation method and system may also be extended to deep architecture by including additional number of hidden layers following the same underlying principle, without loss of generality.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the domain adaptation methods and systems for text classification based on learning of transferable feature representations from a source domain have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for learning transferable feature representations, the method comprising:
receiving, by one or more processors, real-time input data from a computing device over a communication network, wherein the received input data comprises labeled instances of a source domain and unlabeled instances of a target domain;
determining, by the one or more processors, a source specific representation corresponding to the source domain and a common representation shared between the source domain and the target domain;
classifying, by the one or more processors, the labeled instances of the source domain into a plurality of categories based on a first set of one or more representations, using a neural network, the neural network comprising:
an input layer,
a hidden layer connected to the input layer, the hidden layer comprising a plurality of sections, the plurality of sections comprising two or more of a source specific representation, a source representation, a global representation, wherein the hidden layer comprises the first set of one or more representations and the first set of one or more representations comprises the source specific representation and the source representation, the source representation comprising features that are common between a source-target pair in a plurality of source-target pairs from the source and target domains, and
an output layer connected to the hidden layer;
training, by the one or more processors, a generalized classifier based on a positive contribution from the common representation using a domain regressor and the neural network, wherein the hidden layer comprises a second set of one or more representations and the second set of one or more representations comprises the source specific representation and the source representation; and
automatically performing, by the one or more processors, classification on the unlabeled instances of the target domain based on the trained generalized classifier.

2. The method of claim 1, wherein:
the source domain is a first source domain;
the input data further comprises labeled instances of a second source domain;
the first and second source domains constitute a plurality of source domains;
the source specific representation is a first source specific representation;
the common representation is a first common representation;
the source representation is a first source representation;
the method further comprising:
determining, by the one or more processors, a second source specific representation corresponding to the second source and a second common representation shared between the second source domain and the target domain, and
classifying, by the one or more processors, the labeled instances of the second source domain into the plurality of categories using the neural network;
the training is further based on the second common representation, the common representation being a first common representation;
the first and second sets of one or more representations further comprising the second source specific representation and a second source representation, the second source representation comprising features that are common between a second source-target pair in a second plurality of source-target pairs from the second source and target domains; and
the second set of one or more representations further comprises a global representation comprising features common to the first source, second source, and target domains.

3. The method of claim 2, further comprising determining, by the one or more processors, the global representation common between the first source, the second source, and target domains, and determining the first and second source representations.

4. The method of claim 2, wherein one or more of the first and second sets comprise the first source specific representation, the first source representation, the global representation, the second source specific representation, and the second source representation.

5. The method of claim 2, wherein:
the first set comprises the first source specific representation, the first source representation, the global representation, the second source specific representation, and the second source representation;
classifying the labeled instances of the first source domain comprises a positive contribution from the first source specific representation, the first source representation, and the global representation, and a negative contribution from the second source specific representation and the second source representation; and
classifying the labeled instances of the second source domain comprises a positive contribution from the second source specific representation, the second source representation, and the global representation, and a negative contribution from the first source specific representation and the first source representation.

6. The method of claim 2, wherein one or more of the first and second sets comprise the first source specific representation, the first source representation, the global representation, the second source specific representation, and the second source representation.

7. The method of claim 2, wherein:
the first set comprises the first source specific representation, the first source representation, the global representation, the second source specific representation, and the second source representation;
classifying the labeled instances of the first source domain comprises a positive contribution from the first source specific representation, the first source representation, and the global representation, and a negative contribution from the second source specific representation and the second source representation; and
classifying the labeled instances of the second source domain comprises a positive contribution from the second source specific representation, the second source representation, and the global representation, and a negative contribution from the first source specific representation and the first source representation.

8. The method of claim 2, wherein:
the second set comprises the first source specific representation, the first source representation, the global representation, the second source specific representation, and the second source representation; and training the generalized classifier comprises a positive contribution from the first and second source representations and the global representation, and a negative contribution from the first and second source specific representations.

9. The method of claim 1, further comprising maximizing, by the one or more processors, loss and classification ability of the domain regressor by minimizing error of the classification to acquire domain independence.

10. The method of claim 1, further comprising determining, by the one or more processors, a probability that an instance is from the source domain or the target domain.

11. The method of claim 10, further comprising determining, by the one or more processors, a domain divergence between a source sample representation and a target sample representation based on the determination.

12. The method of claim 1, further comprising updating, by the one or more processors, one or more parameters associated with the domain regressor based on a direction of a gradient for features of the common representation and in a direction of a gradient for features of the source specific representation.

13. The method of claim 1, further comprising updating, by the one or more processors, one or more parameters associated with the classification in a direction of a gradient for features of the common representation and features of the source specific representation.

14. A system for learning transferable feature representations, the system comprising one or more processors in a data processing server configured to:
receive real-time input data from a computing device over a communication network, wherein the received input data comprises labeled instances of a source domain and unlabeled instances of a target domain;
determine a source specific representation corresponding to the source domain and a common representation shared between the source domain and the target domain;
classify the labeled instances of the source domain into a plurality of categories based on a first set of one or more representations, using a neural network, the neural network comprising:
an input layer,
a hidden layer connected to the input layer, the hidden layer comprising a plurality of sections, the plurality of sections comprising two or more of a source specific representation, a source representation, a global representation, wherein the hidden layer comprises the first set of one or more representations and the first set of one or more representations comprises the source specific representation and the source representation, the source representation comprising features that are common between a source-target pair in a plurality of source-target pairs from the source and target domains, and
an output layer connected to the hidden layer;
train a generalized classifier based on a positive contribution from the common representation using a domain regressor and the neural network, wherein the hidden layer comprises a second set of one or more representations and the second set of one or more representations comprises the source specific representation and the source representation; and
automatically perform classification on the unlabeled instances of the target domain based on the trained generalized classifier.

15. The system of claim 14, wherein:
the source domain is a first domain;
the input data further comprises labeled instances of a second source domain
the first and second source domains constitute a plurality of source domains;
the source specific representation is a first source specific representation;
the common representation is a first common representation;
the source representation is a first source representation;
the one or more processors further configured to:
determine a second source specific representation corresponding to the second source and a second common representation shared between the second source domain and the target domain, and
classify the labeled instances of the second source domain into the plurality of categories using the neural network;
the training is further based on the second common representation, the common representation being a first common representation;
the first and second sets of one or more representations further comprising the second source specific representation and a second source representation, the second source representation comprising features that are common between a second source-target pair in a second plurality of source-target pairs from the second source and target domains; and
the second set of one or more representations further comprises a global representation comprising features common to the first source, second source, and target domains.

16. The system of claim 15, wherein the one or more processors are further configured to determine the global representation common between the first source, the second source, and target, and to determine the first and second source representations.

17. The system of claim 14, wherein the one or more processors are further configured to:
determine a probability that an instance is from the source domain or the target domain; and
determine a domain divergence between a source sample representation and a target sample representation based on the determination.

18. The system of claim 14, wherein the one or more processors are further configured to update one or more parameters associated with the domain regressor based on a direction of a gradient for features of the common representation and in a direction of a gradient for features of the source specific representation.

19. The system of claim 14, wherein the one or more processors are further configured to update one or more parameters associated with the classification in a direction of a gradient for features of the common representation and features of the source specific representation.

20. A computer program product for use with a computer, the computer program product comprising a non-transitory computer readable medium, wherein the non-transitory computer readable medium stores a computer program code for learning transferable feature representations, wherein the computer program code is executable by one or more processors in a data processing server to:

receive real-time input data from a computing device over a communication network, wherein the received input data comprises labeled instances of a source domain and unlabeled instances of a target domain;

determine a source specific representation corresponding to the source domain, and a common representation shared between the source domain and the target domain;

classify the labeled instances of the source domain based on a first set of one or more representations, using a neural network, the neural network comprising:
an input layer,
a hidden layer connected to the input layer, the hidden layer comprising a plurality of sections, the plurality of sections comprising two or more of a source specific representation, a source representation, a global representation, wherein the hidden layer comprises the first set of one or more representations and the first set of one or more representations comprises the source specific representation and the source representation, the source representation comprising features that are common between a source-target pair in a plurality of source-target pairs from the source and target domains; and
an output layer connected to the hidden layer;

train a generalized classifier based on a positive contribution from the common representation using a domain regressor and the neural network, wherein the hidden layer comprises a second set of one or more representations and the second set of one or more representations comprises the source specific representation and the source representation; and automatically perform classification on the unlabeled instances of the target domain based on the trained generalized classifier.

* * * * *